June 7, 1960 W. P. MASON 2,939,317
VARIABLE RESISTANCE SEMICONDUCTIVE DEVICES
Filed Oct. 31, 1955
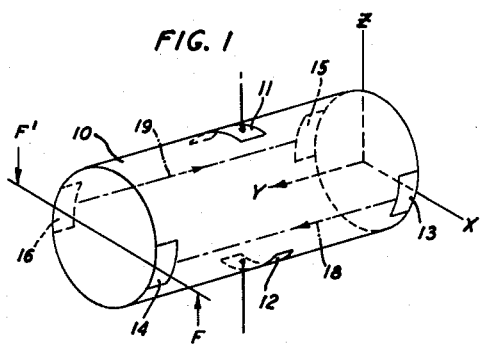
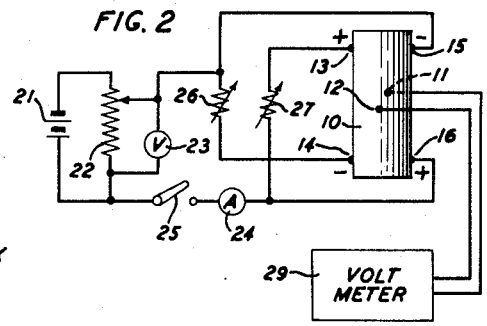
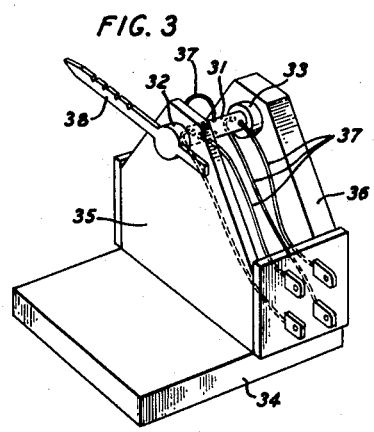
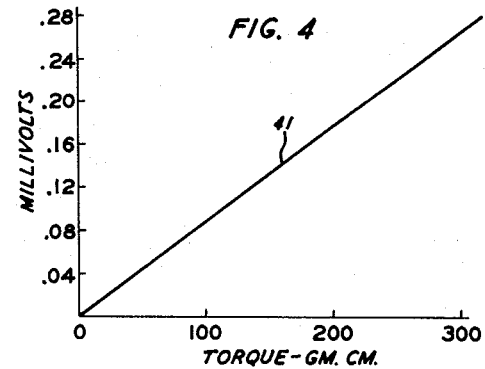
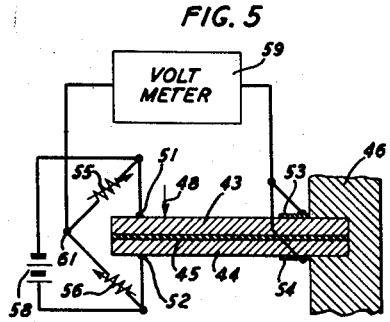
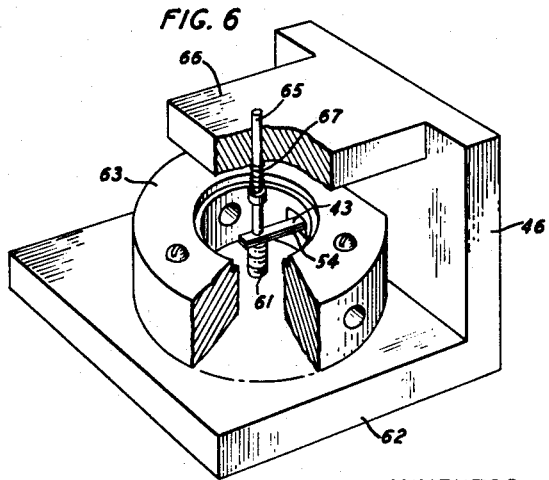
INVENTOR
W. P. MASON
BY
Alan C. Rose
ATTORNEY

United States Patent Office 2,939,317
Patented June 7, 1960

2,939,317
VARIABLE RESISTANCE SEMICONDUCTIVE DEVICES

Warren P. Mason, West Orange, N.J., assignor to Bell Telephone Laboratories, Incorporated, New York, N.Y., a corporation of New York Filed Oct. 31, 1955, Ser. No. 543,859

7 Claims. (Cl. 73—134)

This invention relates to the piezoresistance effect in semiconductors.

When it is desired to convert a mechanical force into an electrical indication, strain gauges, accelerometers and torque meters are normally employed. The more accurate indicating devices of this type characteristically include two elements which are spring biased to a normal position, and electrical means for indicating displacement from the normal position. Strain gauges have also made use of the variable electrical resistance of a fine strand of resistance wire with applied force. In general, however, the spring biased devices tend to be unduly complex and expensive, and the resistance type strain gauges tend to be insufficiently sensitive.

Accordingly, the principal object of the present invention is to concurrently reduce the complexity and increase the sensitivity of force-responsive electrical devices.

In accordance with one aspect of the invention, a torque-responsive electrical device is constructed from a single element of semiconductive material. The torsion element has three pairs of contacts, two of which are employed for introducing biasing currents. The third pair of contacts is located in a symmetrical, balanced position with respect to the other two pairs of contacts, and thus indicates no output voltage when the torsion element is unstrained. When torsional force is applied to the element, however, the balance is upset, and a voltage appears at the third set of contacts.

In accordance with another aspect of the invention, two elements of a semiconductive material are insulated from each other and are rigidly cemented together. By way of example, the two elements may be secured together in a manner similar to the form of a conventional bimetallic thermal element. When the two-element device is strained or deformed, one of the elements is subjected to compression and the other to tension. Under these conditions, the resistance of one element is increased, while that of the other is decreased. The two semiconductive elements are insulated from each other and may conveniently be used as two arms of a Wheatstone bridge.

In a broader sense, the invention is directed to unitary force-responsive electrical devices which include two electrical paths through semiconductive material which are normally in balanced relationship with respect to an output circuit. When a force is applied to such a unit, however, both electrical paths are affected, and the balance at the output circuit is upset.

Other objects and various advantages and features of the invention will become apparent by reference to the following description taken in connection with the appended claims and the accompanying drawings forming a part thereof.

In the drawings:

Fig. 1 is a schematic diagram of a torque-responsive electrical device in accordance with the invention;

Fig. 2 illustrates an electric circuit which may be employed with a torsion device as shown in Fig. 1;

Fig. 3 illustrates a practical embodiment of the torque-responsive device of Fig. 1;

Fig. 4 is a plot of output voltage versus applied torque for the device of Fig. 3;

Fig. 5 is a schematic showing of a two-element semiconductive device and the associated electrical circuit which is employed for measuring force or displacement; and Fig. 6 shows the mechanical mounting arrangements for the two-element device of Fig. 5.

Before embarking on a detailed description of the devices shown in the drawings, a brief discussion of the physical principles underlying the operation of these devices will be helpful. When a force is applied to a semiconductive body in which an electrical current is flowing, the electrical resistance of the material is changed. This effect is the subject of a paper by Charles S. Smith, entitled "Piezoresistance Effect in Germanium and Silicon," which appeared in the Physical Review, volume 94, pages 42 through 49, April 1, 1954.

A simple example of resistance change with force takes place when a wire is stretched. As tension is applied, the length of the wire increases and its diameter decreases. Inasmuch as the resistance is directly proportional to length and inversely proportional to cross-sectional area, the resistance of the wire increases.

When an elongated strip of semiconductive material such as germanium or silicon is stretched, it also exhibits a change in its resistance as measured from one end to the other. In semiconductors, however, the crystalline nature of the material yields variations in electrical properties with applied force as compared with the simple example of the stretched wire of conducting material noted above. For example, in some semiconductors, such as n-type germanium, the resistance actually decreases when tension is applied to an elongated element of the material. In addition, the crystal structure tends to distort the normal paths of current flow through a semiconductive body when mechanical forces are applied to it. Thus, for example, when an unstressed flat rectangular plate of semiconductive material is provided with four terminals at the middle of the four edges of the plate, and current is applied to one pair of opposed terminals, no voltage is observed at the second pair of opposed terminals; when a shearing stress is applied to the plate, however, a substantial voltage appears at the second pair of terminals.

The effects discussed qualitatively in the preceding paragraph are expressed in a quantitative manner by the following equations:

$$\frac{E_1}{\rho} = i_1[1 + \pi_{11}T_{11} + \pi_{12}(T_{22}+T_{33})] + \pi_{44}(i_2 T_{12} + i_3 T_{13}) \quad (1)$$

$$\frac{E_2}{\rho} = i_2[1 + \pi_{11}T_{22} + \pi_{12}(T_{11}+T_{33})] + \pi_{44}(i_1 T_{12} + i_3 T_{23}) \quad (2)$$

$$\frac{E_3}{\rho} = i_3[1 + \pi_{11}T_{33} + \pi_{12}(T_{11}+T_{22})] + \pi_{44}(i_1 T_{13} + i_2 T_{23}) \quad (3)$$

where:

the axes 1, 2 and 3 designated by the subscripts are the mutually perpendicular crystallographic axes,
$\rho$ is the resistivity at zero stress, and
$\pi_{11}, \pi_{12}, \pi_{44}$ are piezoresistance coefficients.

The piezoresistance coefficients have the following approximate values for n-type germanium having a specific resistivity of 1.5 ohm-centimeter:

$$\pi_{11} = -2.3 \times 10^{-12} \text{ cm.}^2/\text{dyne} \quad (4)$$

$$\pi_{12} = -3.2 \times 10^{-12} \text{ cm.}^2/\text{dyne} \qquad (5)$$
$$\pi_{44} = -138.1 \times 10^{-12} \text{ cm.}^2/\text{dyne} \qquad (6)$$

In interpreting Formulae 1, 2 and 3, the significance of the first and second subscripts should be noted. A stress component $T_{12}$, for example, is normal to direction 1 and represents stress applied in direction 2. More generally, the use of subscripts is in accordance with the notation set forth in the appendix of a text entitled: "Piezoelectric Crystals and Their Application to Ultrasonics," by W. P. Mason, D. Van Nostrand Company, Inc., New York, 1950.

Referring more particularly to the drawings, Fig. 1 shows, by way of example, a cylindrical element 10 of semiconductive material which is the central element of a torsion measuring device. A pair of opposed output terminals 11 and 12 are preferably located centrally with respect to the cylindrical element 10 in the vertical or $yz$ reference plane. There are four additional terminals in a horizontal or $xy$ reference plane. Two of these terminals 13, 14 are toward the front portion of the germanium cylinder 10, and two additional terminals 15, 16 are located at the rear portion of the germanium cylinder. The terminals 13 through 16 are input terminals, and voltages are applied to these terminals so that current flows between terminals 13 and 14 in one direction in the front portion of the cylinder as indicated by the arrow 18, and in the other direction between terminals 15 and 16, as indicated by the arrow 19.

When the cylinder 10 is employed as a torque meter, torsional forces are applied to the left-hand end of the cylinder 10, as indicated by the arrows designated F and F'. With the axes and the applied torque as shown in Fig. 1, $T_{yz}$ is positive for the front half of the cylinder ($x>0$) and is negative for the rear half of cylinder 10 ($x<0$). Referring to Equation 3 and substituting $x$, $y$ and $z$ for 1, 2 and 3, respectively, a longitudinal current density $i_y$ produces an electric field $E_z$ at terminals 11, 12 in accordance with the following formula:

$$E_z = \rho \pi_{44} i_y T_{yz} = -\rho |\pi_{44}| i_y T_{yz} \qquad (7)$$

With equivalent currents flowing in opposite directions as indicated at 18 and 19 in the front and back halves of the cylinder 10, the current density $i_y$ changes sign at the $yz$ plane where $T_{yz}$ changes sign. Under these circumstances, the generated electric field $E_z$ which appears at output terminals 11, 12 has the same sign in both halves of the cylinder 10 and a net output voltage will therefore be developed. The voltage which is developed at output terminals 11 and 12 increases in proportion to the applied force F—F' and changes sign when the applied torque is reversed.

The electrical connections for producing the desired biasing currents in Fig. 1 are indicated in Fig. 2. The applied voltage is determined by the direct current source 21 and the potentiometer 22. The voltmeter 23 indicates the applied voltage. The ammeter 24 which is located in the return circuit indicates the amount of current which is applied to the germanium element 10. Current to the germanium element is controlled by the switch 25. The amount of current applied to the germanium element may be controlled by varying the resistances 26, 27. As indicated by the wiring diagram, negative potentials are applied to terminals 14 and 15 and positive potentials are applied to terminals 13 and 16. Accordingly, as viewed in Fig. 2, current will flow in one direction on the left-hand side of element 10 and in the opposite direction on the right-hand side. A sensitive voltmeter 29 is connected to the output terminals 11 and 12.

Fig. 3 illustrates a practical arrangement in accordance with the invention. The germanium element 31 is formed in a dumbbell shape with enlarged cylindrical ends 32 and 33. The germanium element is mounted in a frame including a base plate 34 and two vertical support members 35 and 36. The rear portion 33 of this germanium element is secured to the vertical supporting plate 36, and the enlarged front end 32 of the germanium element 31 is journaled in and extends beyond a hole passing through the plate 35, as shown. Electrical connections to the central cylindrical portion of the germanium element 31 are effected by wires 37. A lever 38 is secured to the front end 32 of the germanium element.

The central cylindrical portion 31 of the germanium element (corresponding to the cylinder 10 of Fig. 1) is about .130 inch in diameter and is one-half inch long. The 100 crystal axis is aligned with the central axis of the cylinder 31. This designation of crystal orientation is in accordance with the so-called Miller indices, which are discussed, for example, on page 14 of the text entitled: "Piezoelectric Crystals and Their Application to Ultrasonics," which was cited hereinabove.

The graph of Fig. 4 shows a plot 41 of the output voltage versus the applied torque for the device of Fig. 3. This plot was obtained by hanging weights at various points along the lever 38 shown in Fig. 3.

To fully appreciate the geometric arrangement of the electrodes in the torque meter of Figs. 1 through 3, it is necessary to note the relative magnitudes of the piezoresistance coefficients given in Equations 4 through 6 and to relate them to Equation 7. In comparing the piezoresistance coefficients, it may be noted at once that the coefficient $\pi_{44}$ given in Equation 6 is about forty times as great as the other piezoresistance coefficients. Now, referring to Equation 7 note that, with the electrode geometry of Fig. 1, the piezoresistance coefficient $\pi_{44}$ is controlling. Accordingly, the electrode arrangement and current distribution, and the strikingly high shear piezoresistance coefficient $\pi_{44}$ combine to give a highly sensitive torque meter.

Figs. 5 and 6 illustrate a two-element piezo-resistance device for the measurement of small forces or displacements. Fig. 5 shows the electrical circuit in addition to showing the two-element device itself in some detail, while Fig. 6 shows an illustrative mechanical mounting arrangement.

In Fig. 5, two strips of semiconductive material 43, 44 are electrically insulated by a thin sheet of polystyrene 45 and are securely cemented together. The assembly was then seated into an opening in a steel base member 46 and rigidly cemented in place. A suitable epoxy cement may be employed to obtain as much rigidity as possible.

When a downward force as indicated by the arrow 48 (Fig. 5) is applied to the end of the assembly 43, 44, 45, it deflects like a cantilever beam. The upper semiconductive portion 43 of the two-element unit is then under tension, and the lower semiconductive portion 44 is under compression. When n-type germanium is employed, the resistance in the upper strip decreases, and the resistance of the lower strip increases. The cumulative effect of the increase in resistance in one-half of the assembly and the decrease in the other is used to unbalance a Wheatstone bridge.

The connections 51, 52 to the outer end of semiconductive strips 43 and 44 are secured with a silver loaded Bakelite cement softened by the addition of benzine. The connections indicated at 53, 54 are effected by painting the junction of the assembly 43, 44, 45 and the base 46 with air-drying silver paint.

The two germanium elements 43, 44 form two arms of a Wheatstone bridge, and the potentiometers 55, 56 form the other two arms of the bridge. The biasing current for the Wheatstone bridge is provided by a suitable voltage source 58. The potentiometers 55 and 56 are adjusted to be equal in value to the resistance of the germanium strips 43 and 44, respectively, when no force is applied to the unit. Under these circumstances, the Wheatstone bridge is balanced and no potential will appear at the voltage detector 59 which is connected between the common point 53, 54 of the germanium strips and the point 61 between the two potentiometers 55 and 56. When a force is applied to the end of the semiconductor assembly, however, the resistance of one of the strips increases and that of the other strip decreases. This unbalances the Wheatstone bridge and produces a substantial output indication at the voltmeter 59.

In Fig. 6, the mechanical mounting arrangement for the two-element device of Fig. 5 is shown in considerable detail. The electrical connections are not shown in Fig. 6, but should, of course, be as illustrated in Fig. 5. The mounting bracket 46 which was shown broken away in Fig. 5 is shown as a generally U-shaped bracket in Fig. 6. An adjusting screw 61 is adjustably threaded through the lower arm 62 of the U-shaped bracket 46. This adjusting screw 61 limits the downward movement of the assembly 43, 44, and thus prevents straining of the assembly beyond its elastic limit. The two-element assembly 43, 44 extends from the plate 46 through a hole in the protective ring 63. Force is applied to the two-element assembly 43, 44 by a plunger 65. The plunger 65 is slidably mounted in a whole in the upper arm 66 of the U-shaped bracket 46. A light spring 67 insures engagement of the plunger 65 with the outer end of the two-element assembly 43, 44. Accordingly, when the plunger 65 is placed in contact with a piece of vibrating machinery, for example, the output voltage which is developed is indicative of the magnitude and frequency of the vibrations. The assembly of Fig. 6 may also be employed to measure the relative movement of two elements. Under these circumstances, the bracket 46 may be secured to one of the two elements, with the plunger 65 engaging the other element.

In the device of Figs. 5 and 6, it is desirable that the strips of semiconductive material be cut so that their longest dimension is properly oriented with respect to the crystal axes. Calculations indicate that the "longitudinal" piezoresistance coefficient for semiconductors such as germanium and silicon is greatest in the 111 direction (in terms of the Miller indices mentioned above).

In the device of Figs. 5 and 6, the electric field, the current and the tension T are each operative along the same direction. Where the longitudinal axis of the strips of semiconductive material are parallel to the 111 crystal direction, the following formula obtains:

$$\frac{\Delta R}{R} = \pi_1 T = -95 \times 10^{-12} T; \text{ (111 direction)} \quad (8)$$

where

R is the resistance,
$\Delta R$ is the change in resistance,
$\pi_1$ is the longitudinal piezoresistance coefficient, and
T is the tensile stress in dynes/cm.²

Young's modulus for the 111 direction in germanium is about $1.56 \times 10^{12}$ dynes/cm.² at 20° C. Therefore, the calculated gauge factor is as follows:

$$\frac{\Delta R}{RS} = -148; \text{ (111 direction)} \quad (9)$$

where

S is the longitudinal unit strain.

While practical problems such as that of a suitable cementing technique may reduce this factor of $-148$ somewhat, preliminary measurements indicate that a gauge factor of at least $-40$ can be readily obtained in practice.

For comparison purposes, it may be noted that commercial strain gauges such as the one disclosed in E. E. Simmons Patent 2,292,549, granted August 11, 1942, have gauge factors ($\Delta R/RS$) ranging from about 1.7 to about 3.5. Thus, the 111 germanium strain gauge has a gauge factor which is at least an order of magnitude greater than wire strain gauges in commercial use. It is also noted that the gauge factor for the 111 direction is about fifty percent greater than for the 110 direction.

It is to be understood that the above-described arrangements are illustrative of the application of the principles of the invention. Numerous other arrangements may be devised by those skilled in the art without departing from the spirit and scope of the invention.

What is claimed is:

1. A strain-responsive electrical device comprising a cylinder of crystalline semiconductive material, a pair of contacts electrically connected to the surface of the cylinder at diametrically opposite positions near each of the ends of the cylinder, respectively, all of the contacts being symmetrically positioned in a predetermined plane which includes the longitudinal axis of the cylinder and a third pair of contacts electrically connected to the surface of the cylinder at diametrically opposite positions near the center of the cylinder, the diameter about which the third pair of contacts are centered being perpendicular to the predetermined plane.

2. In combination, a cylinder of crystalline semiconductive material having first and second mutually perpendicular reference planes passing through its axis, a first pair of terminals connected to opposite sides of said cylinder in said first reference plane intermediate the ends of said cylinder, and four additional terminals located respectively near the four corners of the rectangular intersection of the second reference plane and said cylinder on the surface of said cylinder.

3. A combination as defined in claim 2 wherein means are provided for applying torsional forces to said cylinder.

4. In combination, an elongated body of crystalline semiconductive material, a first pair of spaced opposed terminals located near one end of said elongated body, a second pair of spaced opposed terminals located near the opposite end of said elongated body, said second pair of terminals being aligned in substantially the same direction as said first pair of terminals, and a third pair of spaced terminals located between said first two pairs, the line between said third pair of terminals being substantially perpendicular to the plane of said first and second pairs of terminals, each terminal of said first, second, and third pairs being in conductive engagement with said body of semiconductive material.

5. A combination as defined in claim 4 wherein means are provided for applying torsional forces to said body of semiconductive material.

6. A torque meter comprising a cylinder of crystalline semiconductive material, means for applying torsional forces to said cylinder about its longitudinal axis, a pair of output terminals located on and electrically connected to the surface of and on opposite sides of said cylinder and near the center of the cylinder in a plane including said axis, a second pair of terminals electrically connected to the surface of the cylinder near one end of the cylinder and a third pair of terminals electrically connected to the surface of the cylinder near the other end of the cylinder, the terminals of each pair being diametrically opposite each other along mutually parallel diameters of the cylinder, the last mentioned diameters being in quadrature relation to the diameter about which the output terminals are centered.

7. In combination, a cylinder of crystalline semiconductive material having first and second mutually perpendicular reference planes passing through its axis, a first pair of terminals connected to opposite sides of said cylinder in said first reference plane intermediate the ends of said cylinder, four additional terminals located respectively near the four corners of the rectangular intersection of the second reference plane and said cylinder on the surface of said cylinder, means coupled to said four terminals for establishing current flow in opposite longitudinal directions in said cylinder on opposite sides of said first plane, and electrical signal detection means coupled to said first pair of terminals.

(References on following page)

References Cited in the file of this patent

UNITED STATES PATENTS

| | | |
|---|---|---|
| 2,614,416 | Hollmann | Oct. 21, 1952 |
| 2,625,663 | Howatt | Jan. 13, 1953 |
| 2,756,353 | Samsel | July 24, 1956 |
| 2,864,924 | Mayer | Dec. 16, 1958 |

OTHER REFERENCES

Massey: "Semi-conductors," 24, Journal of Scientific Instruments, 220–224 (August 1947).

Mott: "Semi-Conductors and Rectifiers," 96, Proceedings of Electrical Engineers, 253–260 (September 1949).

Bridgeman: "Effect of Pressure on Electrical Resistance of Certain Semi-Conductors," 79, Proceedings of American Academy of Arts and Sciences (1951), pages 127–147.

Smith: "Piezoresistance Effect in Germanium and Silicon," 94, Phys. Rev., 42–49 (1954).